D. C. SMITH.
Corn Husker.
No. 20,223.
Patented May 11, 1858.
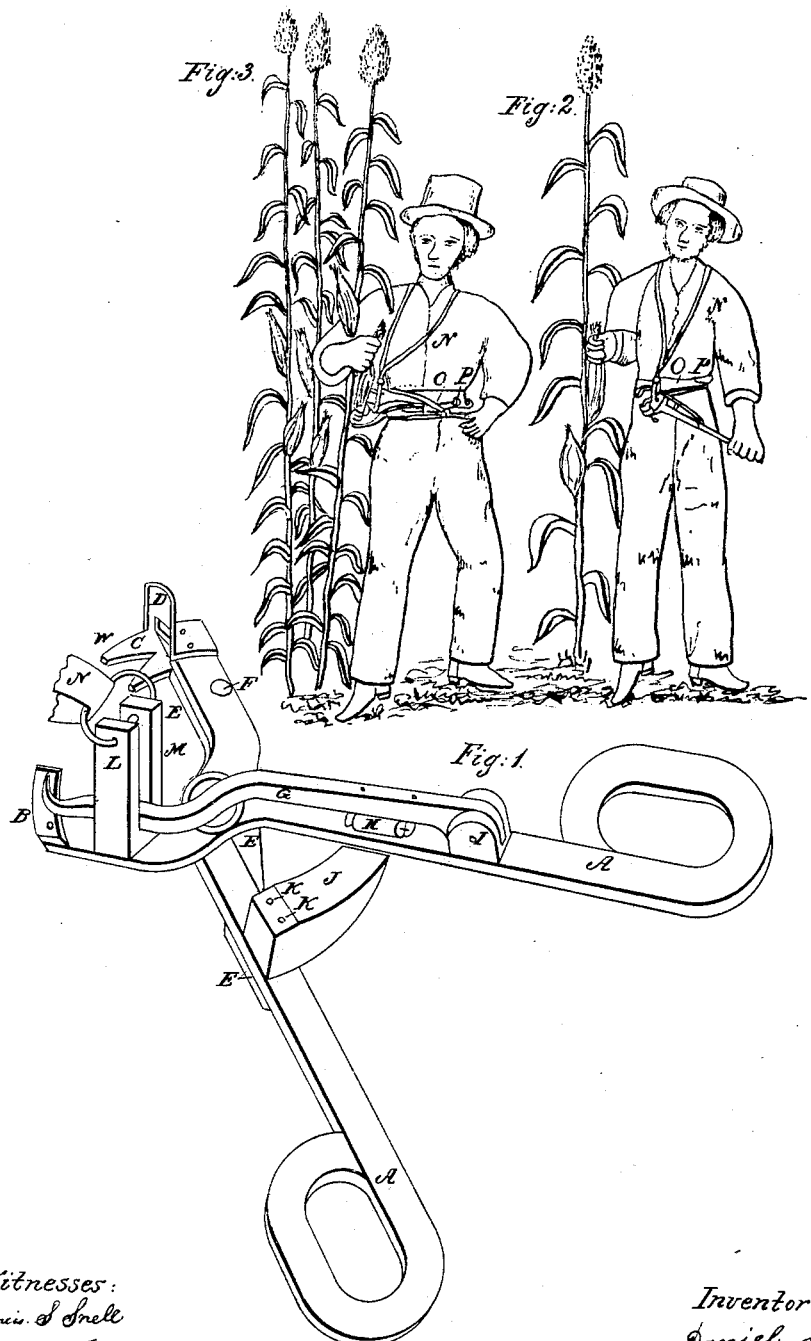

UNITED STATES PATENT OFFICE.

DANL. C. SMITH, OF TECUMSEH, MICHIGAN.

CORN-HUSKER.

Specification of Letters Patent No. 20,223, dated May 11, 1858.

*To all whom it may concern:*

Be it known that I, DANIEL C. SMITH, of Tecumseh, Lenawee county, and State of Michigan, have invented a new and useful Improvement in Husking - Machines for Husking Corn on the Hill; and I do hereby declare that the following is a full, clear, and exact description of the construction and operation of the same, reference being had to the accompanying drawings, and to the letters of reference marked thereon, making a part of this specification, of which—

Figure 1 is a perspective view. of my machine exhibiting its several parts, viz: forceps marked A, knife B, fork C, spring E, thumb-screw F, plate D, lever G, friction roller H, pivot I, wedge J, bolts K, post L, slot M, ring W, and strap N.

Fig. 2 represents the machine open preparatory to the act of husking an ear of corn from the stalk (with the stalk remaining uncut on the ground where it grew) and attached to the belt O at P said belt being buckled around the waist of the person using it, and also attached to strap N by means of ring W, said strap N being around the neck of the operator.

Fig. 3 represents the machine closed upon the ear of corn and also attached as above described.

I will describe the operation of my machine as follows: When the operator opens the machine as seen in Figs. 1 and 2 the wedge J is removed from under the roller H, said roller being secured to lever G. Then the point of said lever falls down on the knife B. Then with the other hand he takes the ear of corn by the top of the husk, (as seen in Fig. 2.) He then passes the stem of the ear into the fork C, said fork being attached to spring E. Then when the operator closes the machine the knife B pierces the husk and stem of the ear, pressing the same against plate D. When the knife has separated the ear from the stem, the machine is closed enough to bring the wedge J under the roller H and lever G, the point of said lever having followed knife B on its passage through the stem or butt of the ear. Then the rest of the motion of closing the machine forces the wedge J under the roller H and lever G. Then the point of said lever forces the ear of corn out of the top of the husk into the hand of the operator as seen in Fig. 3.

The spring E and wedge J, are attached to the forceps A, by the bolts K. The lever G, is hinged to forceps A at I. The spring E and fork C are adjustable by means of the thumb screw F to any place desired for the purpose of cutting the ear at the proper place, so that no corn need be wasted. The lever G, receives its support right and left by means of the slot M, in post L.

I do not claim the forceps separately, but What I do claim and desire to secure by Letters Patent is—

1. The combination of the forceps A, with the wedge J, roller H, lever G, post L with its slot M, the knife B, and plate D, when these several parts are arranged as and for the purposes set forth.

2. I also claim in combination with the forceps A, the spring E, fork C, and thumb screw F, when arranged and operated as and for the purposes specified.

DANIEL C. SMITH.

In presence of—
FRANCIS S. SNELL,
P. BILLS.